United States Patent [19]
Canivet

[11] Patent Number: 4,501,117
[45] Date of Patent: Feb. 26, 1985

[54] DEVICE FOR CONTROLLING AND REGULATING THE CROSS SECTION OF A VARIABLE AREA PROPULSIVE NOZZLE

[75] Inventor: Guy M. C. Canivet, Boissise le Roi, France

[73] Assignee: Societe Nationale d'Etude de Construction de Moteurs d'Aviation, Paris, France

[21] Appl. No.: 552,383

[22] Filed: Nov. 16, 1983

[30] Foreign Application Priority Data

Nov. 29, 1982 [FR] France .................. 82 19949

[51] Int. Cl.³ .............................................. F02K 1/17
[52] U.S. Cl. ................................................... 60/235
[58] Field of Search ............... 60/39.281, 235, 236, 60/237, 238, 239

[56] References Cited

U.S. PATENT DOCUMENTS

| | | |
|---|---|---|
| 2,726,507 | 12/1955 | Baker et al. |
| 2,818,703 | 1/1958 | Victor. |
| 2,834,182 | 5/1958 | Culbertson. |
| 4,137,707 | 2/1979 | Wanger .................. 60/39.281 |
| 4,142,364 | 3/1979 | Wanger .................. 60/39.281 |

FOREIGN PATENT DOCUMENTS 1295470 3/1965 France .
1514925 1/1968 France .

Primary Examiner—Louis J. Casaregola
Attorney, Agent, or Firm—Bacon & Thomas

[57] ABSTRACT

Disclosed is an improved device to control and regulate the opening and closing of a cross section of a turbojet propulsive nozzle having at least one hydraulic cylinder acting on at least one movable flap element. The invention includes a first system to supply the cylinder with hydraulic fluid under pressure for normal operation and a second supply system to be used in an emergency. The elements for changing from the normal operation to an emergency operation are combined with the elements to generate in the hydraulic cylinder a differential pressure, such that the cross section of the nozzle assumes an intermediate position assuring sufficient thrust for the engine, while avoiding the danger of overloading the compressor. The system is effected automatically when the pilot actuates the emergency supply system.

15 Claims, 9 Drawing Figures

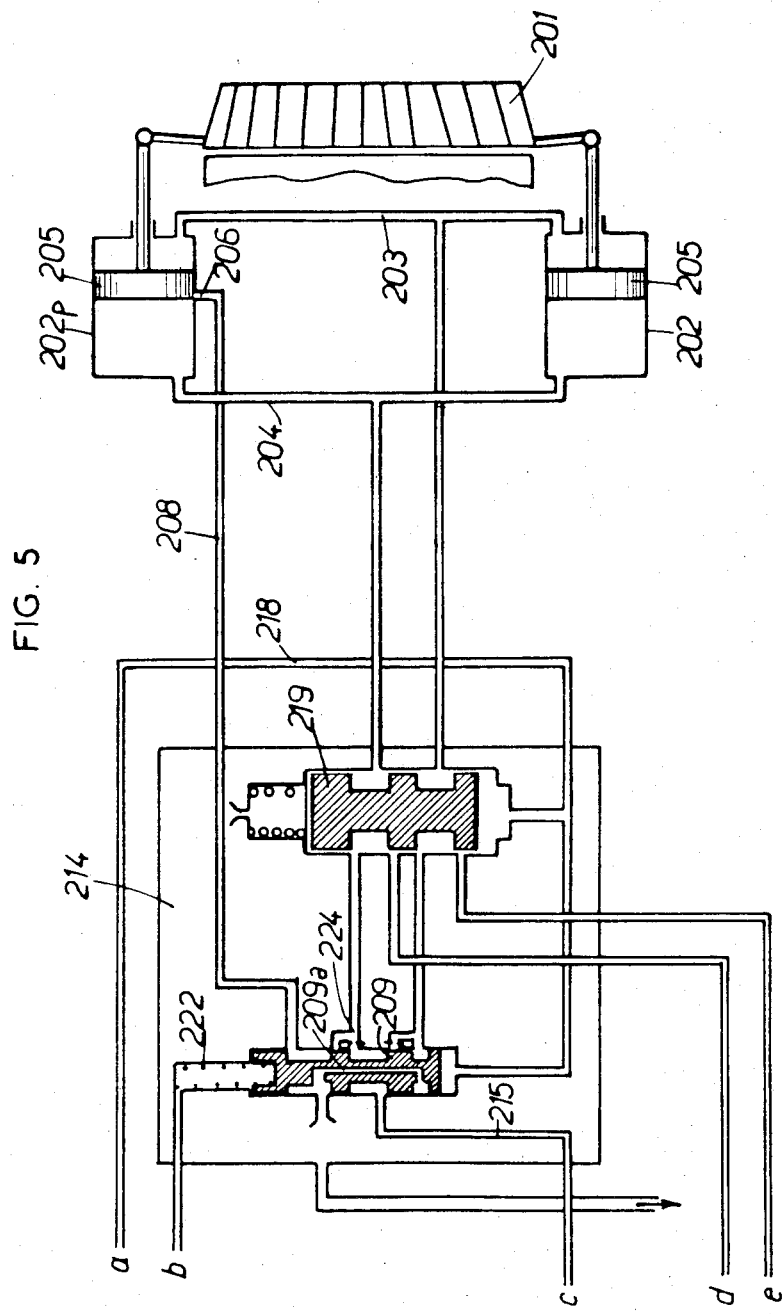

DEVICE FOR CONTROLLING AND REGULATING THE CROSS SECTION OF A VARIABLE AREA PROPULSIVE NOZZLE

BACKGROUND OF THE INVENTION

1. Field of the Invention

The present invention concerns a device for controlling and regulating the cross sectional opening of a variable are propulsive nozzle.

2. Brief Description of the Prior Art

Known aircraft turbojet engines are equipped with a main fuel regulator, which under normal conditions controls the flow of fuel delivered to the combustion chambers, and an auxiliary or emergency fuel regulator which the pilot may substitute for the main regulator in case of a failure of the main regulator to permit continuation of the flight to the nearest landing.

A system of this type has already been described in French Pat. No. 2,406,079, filed by the present applicant on Oct. 11, 1977.

In many cases, however, the turbojet engine does not provide adequate propulsive thrust when the engine has been switched over to the auxiliary fuel regulator in flight, nor do those systems provide for the reignition of the turbojet engine.

SUMMARY OF THE INVENTION

The invention provides a solution to these problems and sets forth a system which provides adequate propulsion thrust when the engine is switched to the emergency regulator in flight.

This solution comprises the use of a nozzle equipped with a cross section regulator controlled by means of an hydraulic cylinder which permits the variation of thrust by varying the nozzle cross section. The invention comprises means, in combination with elements for changing the engine from normal to emergency operation, for generating in the hydraulic cylinder a differential pressure such that the nozzle cross section will assume an intermediate value assuring sufficient thrust for the engine, while at the same time avoiding the danger of overloading the compressor. The means are activated automatically when the pilot switches from the normal to the emergency mode of fuel supply.

These means consist of valves displaced upon the change effected by the pilot from normal to emergency operation.

A further feature of the invention enables one of the valves to receive, through a maneuver of the pilot at the onset of the aforementioned change, a momentary command maintaining it in its normal mode of operation, so that the hydraulic cylinder is placed or remains in a position corresponding to the full opening of the nozzle. This facilitates the reignition of the combustion chambers, if necessary.

The hydraulic cylinder controlling the device to regulate the cross section, or a pilot cylinder mounted in parallel, has in addition to its supply lines opening near the bottom of the cylinder, at least one supplementary orifice controlled by the piston so that it is opened or closed according to the position of the piston such that it communicates with one or the other of the two chambers of the cylinder. The supplementary orifice may be closed by a spool valve (normal operation) or placed into communication by means of the valve with the pump return line (emergency operation). In the first case, the orifice decreases (in the pilot cylinder and in the other cylinders supplied in parallel with it) the pressure prevailing in the chamber of the hydraulic cylinder with which it is in communication, to render the pressure existing in the other chamber preponderant.

The hydraulic fluid used to control the cylinders is preferably the fuel itself, under the pressure supplied by the pump of the main fuel regulator during normal operation or under the pressure furnished by the pump of the emergency fuel regulator, during emergency operation.

BRIEF DESCRIPTION OF THE DRAWINGS

The description hereinafter, with reference to the drawings attached hereto, of nonlimiting examples, will make apparent how the invention may be embodied, with the understanding that the characters appearing in both the text and the drawings are part of the present invention.

FIG. 5 is a schematic diagram of a second embodiment of a system according to the invention.

DETAILED DESCRIPTION OF THE PREFERRED EMBODIMENTS

Figure 1:
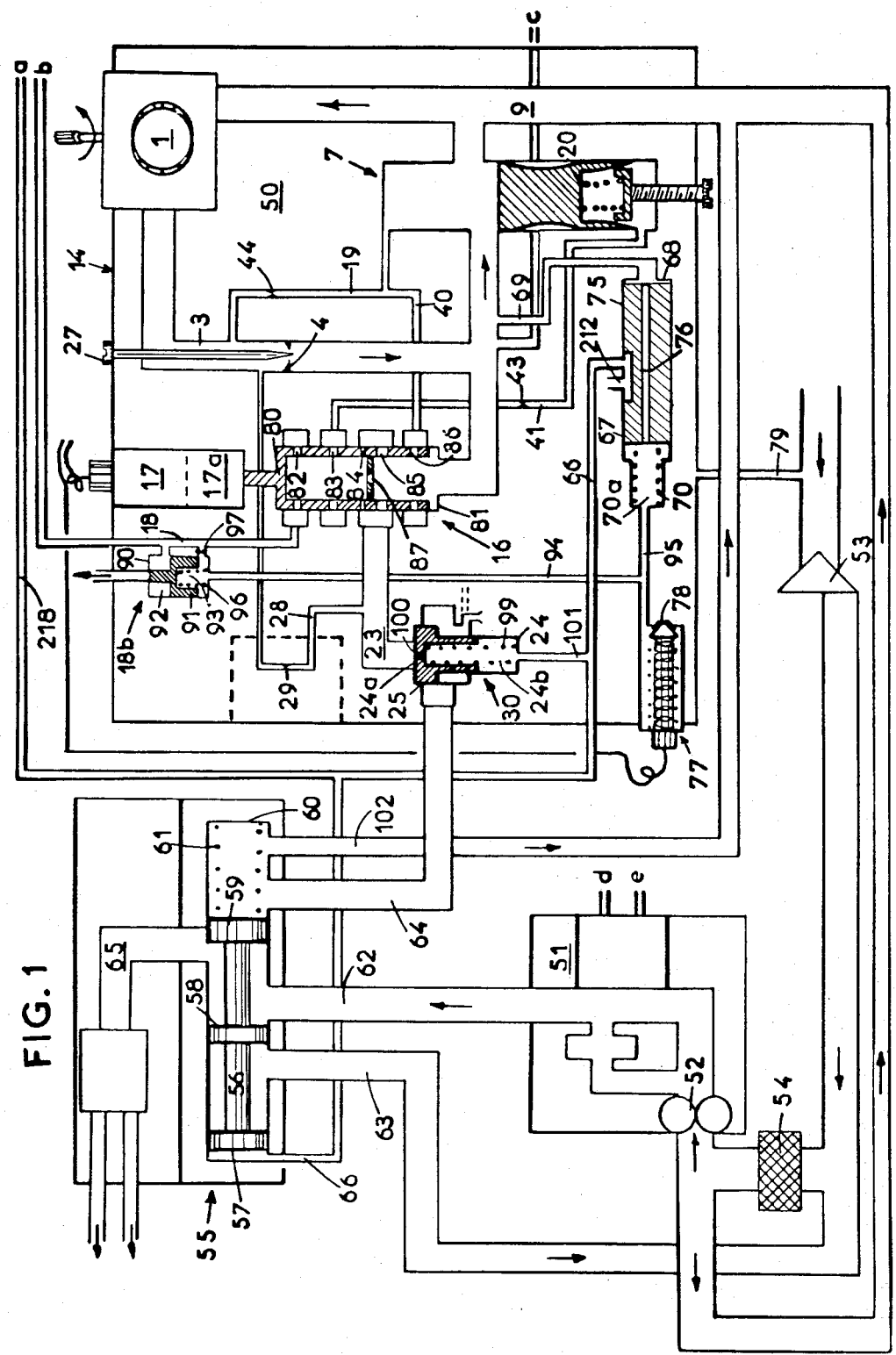
FIG. 1 is a schematic diagram of the system of French Pat. No. 2,406,079 with hydraulic lines a, b, c added according to the invention.
Figure 7:
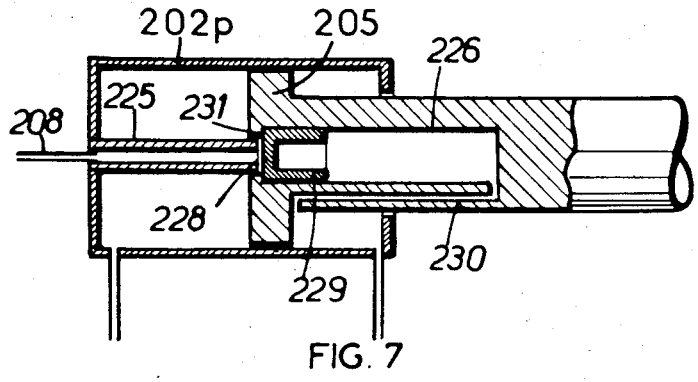
FIG. 7 is a sectional view of a fourth embodiment of the pilot cylinder according to the invention in a first position.

In FIG. 1, FIG. 7 of French Pat. No. 2,406,079 is reproduced, with certain modifications that will become apparent from the description hereinafter, while the reference numbers used in said patent are retained to facilitate the identification of the elements.

Figure 1A:
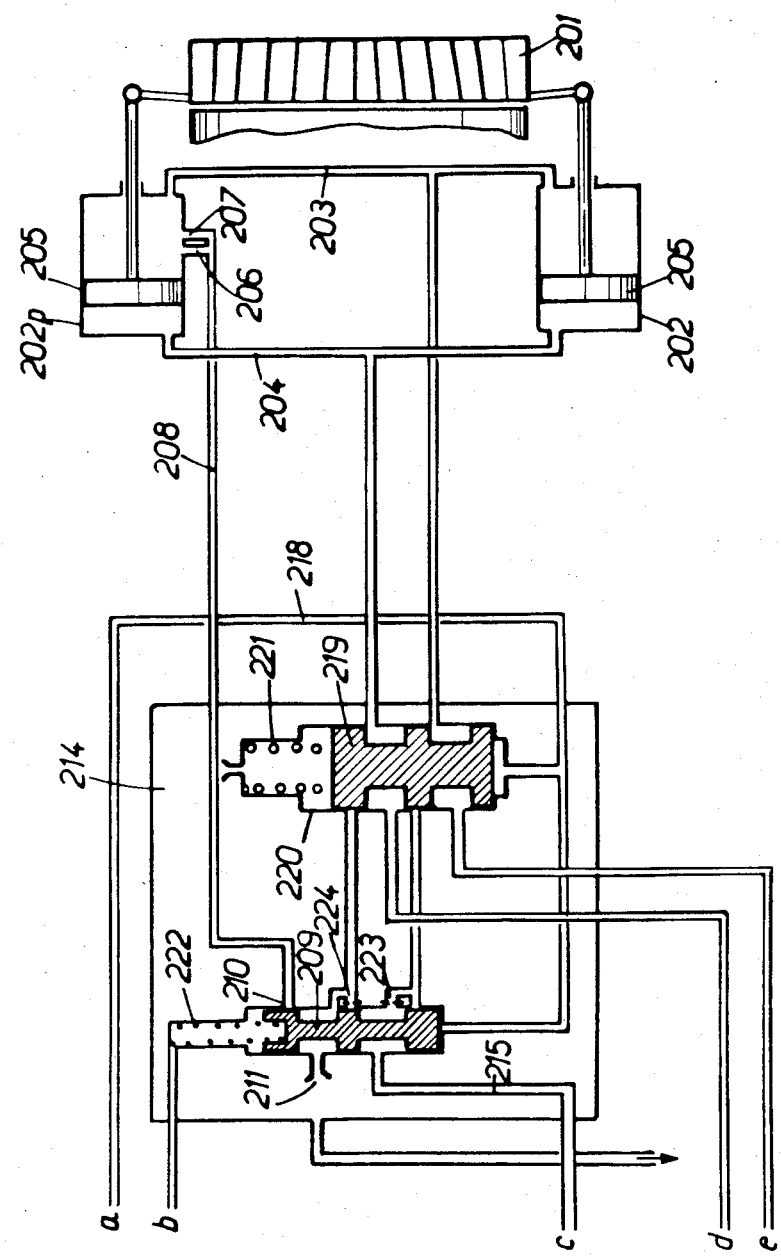
FIG. 1a is a schematic diagram of a first embodiment of the system according to the invention, showing the positions of the elements in the normal operating mode.

The three branch lines marked a, b, c shown in FIG. 1 are connected with those marked with the same reference symbols in FIG. 1a, in which a first embodiment of a device according to the invention to control the cross section of the nozzle is shown.

The elements of the emergency regulator shown in FIG. 1 shall not be described in detail and reference may be made to the description given in the aforecited patent.

Briefly, the main fuel regulator is shown at 51 with its pump 52, which communicates with the fuel line to the injectors of the combustion chambers at 65. The emergency fuel regulator is shown at 14 with its pump 1, switching valve 16 with its rotating cock 80, the rotation whereof the pilot actuates by means of the electric motor 17, when the emergency flow is to be actuated. The valve 55 with the mobile spool 56, depending on the position it occupies, directs the fuel furnished by the pump of the main regulator 51 to the injectors of the combustion chambers, while returning through the conduits 64 and 102 the fuel supplied by the emergency pump 1, or vice versa (in the drawing, the spool 56 is shown in the position wherein the main regulator 51 is in service with its pump 52). A valve 7 may be set to return the discharge of the emergency pump 1 upstream from the cock 80 (this position of the slide of the valve 7 is shown in FIG. 1), or to separate the return flow so that the high pressure provided by the emergency pump becomes active. A mobile slide valve is seen at 67 and is actuated by the pressure applied by the line 69 connected to the discharge of the pump 1 in opposition to the spring 70 and by the pressure in the line 95 downstream from the electromagnetic cock valve 77. This valve is normally closed and is opened by the pilot when the emergency regulator is activated.

The device to regulate the cross of the nozzle connected at lines a, b, c shall now be described with respect to FIG. 1a. In this figure, the elements are again in their normal operating positions when regulation is effected by the main regulator 51.

In FIG. 1a, the assembly of movable flaps used to regulate the effective cross section of the nozzle of a turbojet engine is shown schematically at 201. The configuration of such a device, capable of numerous variations, is well known in itself and does not require a detailed description.

The movement of these flaps to increase or reduce the effective cross section of the nozzle is controlled by an assembly of hydraulic cylinders distributed around the axis of the nozzle, each cylinder actuating one flap or a group of flaps. These various hydraulic cylinders, connected in parallel, are of a conventional configuration. As shown, each cylinder 202 has a conduit 203 for the admission of hydraulic fluid to open the nozzle, (designated hereafter POT) and a conduit 204 to admit the hydraulic fluid to close the nozzle (designated hereafter PFT). In this manner, a displacement of the pistons 205 in the cylinders from the right to the left of FIG. 1a, correspond to the opening of the nozzle, while a displacement from the left to the right corresponds to closing or reducing the cross section of the nozzle.

One of the cylinders 202p, acting as a pilot cylinder, is shown in the upper part of FIG. 1a. It is connected with the conduits 203 and 204 as are the other cylinders, but further comprises, in a suitably chosen intermediate zone through its wall, two orifices 206, 207, longitudinally spaced apart a distance less than the thickness of the piston so that, in a certain position, the piston simultaneously closes the two orifices. The latter are both connected with a conduit 208, which by the operation of a spool valve 209, may be closed off at 210 (FIG. 1a) and thus be placed out of action, or connected through 211 (FIG. 2) with the return lines of the pumps.

Between the main regulator 51 and the emergency regulator 14 a control device 214 is located, the function whereof is to substitute for the pressures supplied by the main regulator 51 controlling the nozzle cylinders 202 (pressures POT and PFT), those applied by the emergency regulator 14, when the latter is actuated, and vice versa.

In the position of the elements shown in FIGS. 1 and 1a, the emergency regulator 14 is inactive and the main regulator 51 is the only one activated. Electromagnetic cock valve 77 is closed so that chamber 70a is at the same pressure as chamber 68, via communication through orifice 76. Under the action of the spring 70, slide valve 67 occupies the position shown in FIG. 1 whereby it connects to return line 212, the pipe 66 connected with line a (conduit 218). In this manner, in the control device 214, the spool 219 of the valve 220 is biased by spring 221 in the position shown such that conduits 203 and 204, which control cylinders 202, are supplied by main regulator 51, the pressure outlets whereof are connected by lines d and e. Further, spool 209 is biased by spring 222 in the position shown where it closes the conduit 208 connected with orifices 206 and 207 of the pilot cylinder 202p. These orifices, therefore, remain out of action and the regulation of the nozzle is effected in accordance with the operation of main regulator 51. In particular, the nozzle may be opened and remains open widely, corresponding to the position of the pistons 205 shown in FIG. 1a.

If a failure of the main regulator 51 occurs, the emergency regulator 14 is placed into service by manual activation of the electromagnetic cock valve 77 (by known switch means not shown) and the motor 17 such that the cock 80 is placed so that it does not supply fluid to the conduit 18 through the orifices 82 (FIG. 1) as described in the aforecited patent. The result of such activation is twofold:

initially, the pressure in the chamber 70a is connected to the return line by means of the opened electromagnetic cock valve 77 such that the pressure in pipe 69 which is maintained at high pressure, forces slide valve 67 toward the left into the position opposite to that shown in FIG. 1, thereby cutting off conduits 66 and 218 from the return line 212;

the high pressure emergency fuel is admitted into the conduits 66 and 218 via ressure regulating valve 30 which receives the fuel supplied by emergency pump 1. This effects, on the one hand, the displacement of spool 56 of valve 55 to the right and the consequent supply of the emergency fuel to the combustion chambers, and on the other hand, the displacement of the spools 209 and 219 into the position shown in FIG. 2.

As may be seen, the spool 219 then cuts the communication of the conduits 203 and 204 with the main regulator 51 and in contrast permits the passage of the fuel introduced through line c in line 215 to the conduits through the orifices 223 and 224, opened by the spool 209.

Simultaneously, the spool 209 has connected return line 211 to the conduit 208 which communicates with the orifices 206 and 207 of the pilot cylinder 202p.

Figure 2:
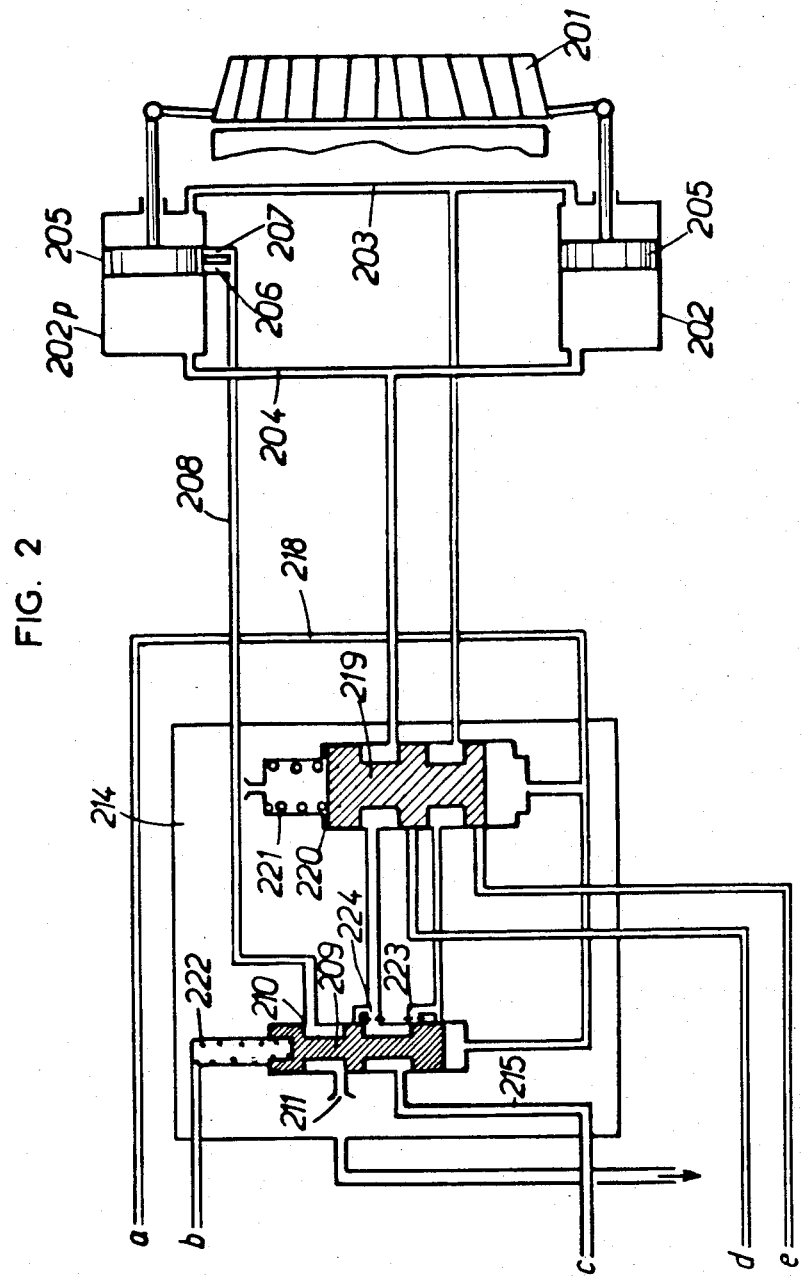
FIG. 2 is a schematic diagram of the embodiment of FIG. 1a showing the positions of the elements in the emergency operating mode.

Assuming that during the initial period when normal operation is suspended, i.e., the spools 209 and 219 are in the positions shown in FIG. 2 and the nozzle is fully opened, corresponding to the positions of the pistons 205 shown in FIG. 1a, the fuel arriving through the conduit 203 and filling the right hand chambers of the cylinders is able to flow through the conduit 208 to the return line 211. In other words, the action of the pressure PFT becomes dominant with respect to the pressure POT causing the pistons 205 to move toward the right, thereby reducing the cross section of the nozzle and increasing the thrust. The closing movement continues until the piston 205 of the pilot cylinder 202p moves over the orifices 206 and 207, thereby closing them off. Since fluid on the right of pistons 205 can no longer pass to the return line, the pressure increases until movement of the pistons are stopped. The placement of two successive orifices has the advantage of insuring the precise position of the piston, regardless of the direction of the forces acting on the piston rod.

The aforedescribed operation assumes that there has been no extinction of the combustion chambers prior to the conversion to emergcy operation. If such an extinction has taken place, the combustion chambers must be re-ignited.

For this purpose, the cock 80 is placed in a position so that it will supply the conduit 18 through the orifices 82, and the electromagnetically controlled cock valve 77 is opened to effect the opening of the flap valve 92, admitting the fuel to the ignition injectors of the combustion chambers. Simultaneously, the fuel introduced at line b maintains the pressure above the spool 209, so that the pressures above and below the spool being approximately equal, the spring 222 maintains the spool 209 in the position of FIG. 1a, while the spool 219 has taken the position in FIG. 2.

In this configuration of the spools, the cylinders 202 are supplied in the following manner:
  the pressure PFT is lowered by connecting it with the return line through spool 209;
  the pressure POT is equal to the high pressure of the emergency pump transmitted at line c via spool 209 and orifice 223;
  the nozzle is maintained completely open to facilitate re-ignition.

When re-ignition has been effected, the pilot rotates the cock 80, which then leaves the re-ignition position. In the meantime, the opening of the flap valve 91 to supply fuel to the ignition injectors has reduced the pressure in the line 18 and, consequently, on line b acting on the upper surface of the spool 209. This spool, which remains exposed on its lower face to the pressure of the fluid supplied through the flap valve 30 and through line a, is displaced against the force of the spring 222 to take the position shown in FIG. 2 and the aforedescribed mode of regulation is resumed.

Orifices 223, 224 of the emergency fuel controlled by the spool 209, are equipped with restrictions. These restrictions control the velocity of fluid flowing through orifices 223, 224 and regulate the velocity of the displacement of the nozzle flaps during their transitory movement.

Thus, during the abovedescribed regulating process, when the nozzle is displaced toward its closing position and the piston of the pilot cylinder 202p begins to cover the orifices 206 and 207, the pilot cylinder forms, with the restriction 223, a kind of hydraulic potentiometer. In this manner, as the limit of the movement of the nozzle flaps toward closure, the pressure POT rises rapidly, until the cylinders are in equilibrium. The stabilization position depends on the forces to be provided by the cylinders, which vary with the operational conditions of the turbojet engine.

At a certain instant, the orifices 206 and 207 are completely covered, their separation being suitably chosen to approximate the thickness of the piston for this purpose. The pressures POT and PFT are then both equal to the pressures supplied by the emergency pump at line c.

At this point the force acting on each cylinder is due to the effect of equal pressures acting on the different active surfaces of the opposite faces of the pistons, the difference being equal to the cross sectional area of the piston rod. This force may still be too high under certain conditions and may cause the nozzle to continue its movement toward closure, to the extent that orifice 206 is uncovered thereby allowing fluid to leak into return line 211 via opening 210 and line 208. This leakage combined with the restricted flow passing through restriction 224 causes a pressure drop which leads to a decline in the pressure PFT, thereby effecting the stabilization of the nozzle. Depending on the operating conditions of the jet engine, the aforedescribed device thus leads to a regulation of the nozzle in a position that is not rigorously defined and which may vary between the two extreme positions of piston 205 as outlined in FIGS. 3 and 4.

Figures 3, 4:
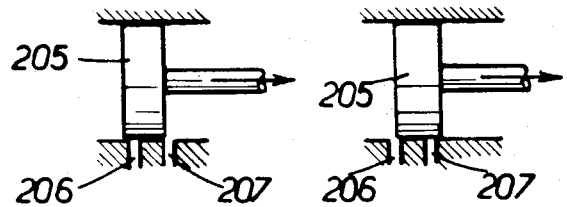
FIGS. 3 and 4 are schematic diagrams showing in detail the positions of the pilot cylinder piston of FIGS. 1a and 2.

This assumes that the pressure provided at line c by the emergency pump is sufficient for the case of FIG. 3 to occur, which generally is obtained over the greater part of the emergency flight range. In the contrary case, the nozzle would open partially until the force to be provided, which decreases with increasing nozzle cross sections, corresponds to the pressure available at line c.

In the variant of embodiment shown in FIG. 5, the wall of the pilot cylinder 202p has only one orifice 206. The spool 219 is unaltered, as is the piping circuit. However, spool 209 is modified by providing an axial channel 209a which, when in the emerency operation position shown in FIG. 5, connects the pressure POT to the return line.

Functions in normal operation, i.e., with the main fuel regulator, remain unchanged with respect to what has been described hereinabove, in relation to FIGS. 1 and 1a.

In an emergency operation, spool 219 and spool 209 are in the positions shown in FIG. 5, the pressure PFT is connected by line c to discharge pressure of the emergency pump, while the pressure POT is connected with the return via the axial channel 209a. The flaps of the nozzle are therefore displaced toward closing until the piston 205 of the pilot cylinder 202p passes to the right of orifice 206 as shown in FIG. 5. At this moment, the presure PFT escapes to the return line via conduit 208 and the flow through the restriction 224 generates a loss of pressure which reduces the pressure PFT until the piston 205 of the pilot cylinder 202p and, consequently, the flaps of the nozzle are stabilized. When the orifice 206 is completely open, the pressure PFT becomes substantially equal to the return pressure of the emergency pump and the force on each cylinder is reduced to the effect to the pressure acting on the differential areas of the piston faces under the effect of the return pressure prevailing on each side of the piston.

Figure 6:
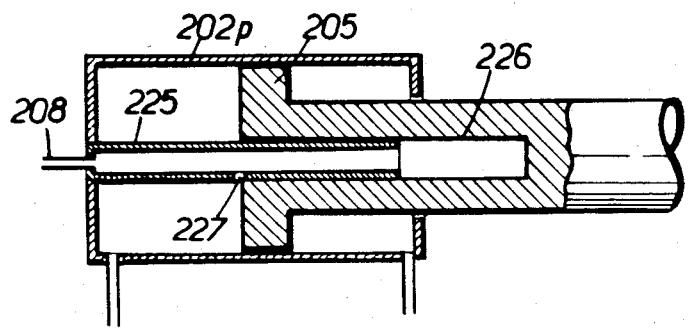
FIG. 6 is a sectional view of a third embodiment of the pilot cylinder according to the invention.

In the embodiment shown in FIG. 6, the pilot cylinder 202p has no orifice in its wall. A tube 225 is fastened to one end of the cylinder and extends along its longitudinal axis. The tube extends into an axial bore 226 formed in the piston and the piston rod. The external surface of the tube 225 and the internal surface of the bore 226 are adapted to closely fit together, for example by grinding, so as to reduce to a minimum the leakage of fluid between the tube and the bore, while permitting sliding motion of the piston with respect to the tube without excessive friction. At a suitable point of its wall, an orifice 227 is formed in the tube. This orifice may be covered and uncovered by the piston 205 during the relative moment between the piston and the tube.

As may be readily seen, if the lateral orifices at either end of the cylinder are connected with the pressures POT, PFT, in keeping with a layout similar to that of FIG. 5, and the inside of the tube 225 is connected to conduit 208, the device will operate in a manner entirely similar to that described with respect to FIG. 5.

If it is desired to avoid the difficulty of providing accurate centering between the tube 225 and the body of the pilot cylinder, the device may be modified as shown in FIG. 7. In this variant, the tube does not have a lateral orifice, but instead its open end 228 cooperates with a small secondary piston 229 located in a bore 226 formed in the piston rod of the pilot cylinder. The bore is in communication, by means of a channel 230, with the chamber located to the right of the piston which receives the pressure POT, with the latter therefore prevailing to the right of the small piston 229.

The operation of this variant is easily comprehended. When the piston of the pilot cylinder is located toward the left of FIG. 7, i.e., in the "nozzle open" normal operating position, the free end of the tube 225 bears against the secondary piston 229. The end 228 of the tube 225 and the face cooperating with the auxiliary piston 229 being ground flat, the tube 225 and the piston 229 together form a flap valve that is closed.

Figure 8:
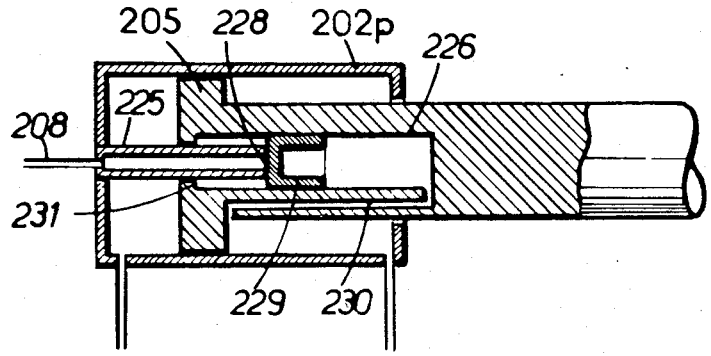
FIG. 8 is a sectional view of the fourth embodiment of the pilot cylinder of FIG. 7 in a second position.

The piston 229 may move inside the bore 226 to permit the continuation of the moment of the piston 205 toward the left after the end 228 of the tube 225 has been applied against the piston 229. When the piston 205 is displaced to the right to close the nozzle, the flap valve formed by the end 228 of the tube 225 and the piston 229 remains closed at the onset of said movement, as shown by the diagram of FIG. 8. The piston 229 remains stationary until said piston abuts against the internal shoulder 231 of the piston 205, at which instant the end 228 of the tube 225 is uncovered, thus permitting the pressure to drop in the chamber to the left of the cylinder, as shown in FIG. 7.

It is evident that the modes of embodiment described hereinabove are given only as examples and that they may be modified in particular by the substitution of equivalent technical means, without exceeding the scope of the present invention.

I claim:

1. In an aircraft turbojet engine having a variable area propulsive nozzle, first supply means to supply fuel to the engine under normal operating conditions, second supply means to supply fuel to the engine under emergency operating conditions in case of failure or malfunction of the first supply means, switching means movable between first and second positions to switch the fuel supply from the first supply means to the second supply means and hydraulic cylinder means including a piston and a rod connected to movable flaps so as to vary the cross sectional area of the propulsive nozzle, the improved apparatus for controlling the operation of the variable nozzle comprising: (a) means to direct an actuating fluid into the hydraulic cylinder means when the switching means is moved into the second position such that the cross sectional area of the propulsive nozzle is reduced; and, (b) orifice means associated with at least one of the hydraulic cylinders to limit the travel of the piston in the cylinder thereby limiting the amount of reduction of the nozzle area so as to prevent overloading the compressor of the turbojet engine.

2. The improved nozzle control apparatus of claim 1 wherein the switching means includes a spool valve with a spool slidably retained therein, and further comprising conduit means connected between the spool valve and the orifice means such that the spool valve closes the conduit means during normal operating conditions when the switching means is in the first position and opens the conduit to a return line during emergency operating conditions when the switching means is in the second position.

3. The improved nozzle control apparatus of claim 2 wherein the switching means is movable to a third, re-ignition psition and further comprising means to maintain the spool in a position wherein it closes the conduit means thereby maintaining the nozzle in an open position to facilitate engine re-ignition when the switching means is in the third position.

4. The improved nozzle control apparatus of claim 3 wherein the orifice means comprises a pair of orifices defined by a wall of the hydraulic cylinder, the orifices being longitudinally spaced apart a distance less than the thickness of the piston such that during a portion of its travel, the piston covers the two orifices simultaneously.

5. The improved nozzle control apparatus of claim 3 wherein the orifice means comprises: (a) an opening defined by an end wall of the hydraulic cylinder, the opening being connected so as to communicate with the conduit means; (b) an axial bore defined by the piston and the rod; and, (c) a hollow tube attached to the interior of the hydraulic cylinder such that its interior communicates with the conduit means through the opening and slidably extending into the axial bore, the wall of the hollow tube defining an orifice which is covered by the piston and rod when the nozzle is in its normal operating position and is uncovered when the movable flaps have reduced the cross sectional area of the nozzle a desired amount.

6. The improved nozzle control apparatus of claim 3 wherein the orifice means comprises: (a) an opening defined by an end wall of the hydraulic cylinder, the opening communicating with the conduit means; (b) an axial bore defined by the piston and the rod; (c) a secondary piston slidably received in the axial bore; and (d) a hollow tube attached to the interior of the hydraulic cylinder such that its interior communicates with the conduit means through the opening, the hollow tube extending into the axial bore and bearing against the secondary piston when the nozzle is in its normal operating position and being displaced from the secondary piston when the flaps have reduced the cross sectional area of the nozzle a desired amount.

7. The improved nozzle control apparatus of claim 3 further comprising means to direct a portion of the fuel from the second supply means to the hydraulic cylinder means, the fuel acting as the actuating fluid.

8. The improved nozzle control apparatus of claim 2 wherein the orifice means comprises a pair of orifices defined by a wall of the hydraulic cylinder, the orifices being longitudinally spaced apart a distance less than the thickness of the piston such that during a portion of its travel, the piston covers the two orifices simultaneously.

9. The improved nozzle control apparatus of claim 2 wherein the orifice means comprises: (a) an opening defined by an end wall of the hydraulic cylinder, the opening being connected so as to communicate with the conduit means; (b) an axial bore defined by the piston and the rod; and, (c) a hollow tube attached to the interior of the hydraulic cylinder such that its interior communicates with the conduit means through the opening and slidably extending into the axial bore, the wall of the hollow tube defining an orifice which is covered by the piston and rod when the nozzle is in its normal operating position and is uncovered when the movable flaps have reduced the cross sectional area of the nozzle a desired amount.

10. The improved nozzle control apparatus of claim 2 wherein the orifice means comprises: (a) an opening defined by an end wall of the hydraulic cylinder, the opening communicating with the conduit means; (b) an axial bore defined by the piston and the rod; (c) a secondary piston slidably received in the axial bore; and (d) a hollow tube attached to the interior of the hydraulic cylinder such that its interior communicates with the conduit means through the opening, the hollow tube extending into the axial bore and bearing against the secondary piston when the nozzle is in its normal operating position and being displaced from the secondary piston when the flaps have reduced the cross sectional area of the nozzle a desired amount.

11. The improved nozzle control apparatus of claim 2 further comprising means to direct a portion of the fuel from the second supply means to the hydraulic cylinder means, the fuel acting as the actuating fluid.

12. The improved nozzle control apparatus of claim 1 wherein the orifice means comprises a pair of orifices defined by a wall of the hydraulic cylinder, the orifices being longitudinally spaced apart a distance less than the thickness of the piston such that during a portion of its travel, the piston covers the two orifices simultaneously.

13. The improved nozzle control apparatus of claim 1 wherein the orifice means comprises: (a) an opening defined by an end wall of the hydraulic cylinder, the opening being connected so as to communicate with the conduit means; (b) an axial bore defined by the piston and the rod; and, (c) a hollow tube attached to the interior of the hydraulic cylinder such that its interior communicates with the conduit means through the opening and slidably extending into the axial bore, the wall of the follow tube defining an orifice which is covered by the piston and rod when the nozzle is in its normal operating position and is uncovered when the movable flaps have reduced the cross sectional area of the nozzle a desired amount.

14. The improved nozzle control apparatus of claim 1 wherein the orifice means comprises: (a) an opening defined by an end wall of the hydraulic cylinder, the opening communicating with the conduit means; (b) an axial bore defined by the piston and the rod; (c) a secondary piston slidably received in the axial bore; and (d) a hollow tube attached to the interior of the hydraulic cylinder such that its interior communicates with the conduit means through the opening, the hollow tube extending into the axial bore and bearing against the secondary piston when the nozzle is in its normal operating position and being displaced from the secondary piston when the flaps have reduced the cross sectional area of the nozzle a desired amount.

15. The improved nozzle control apparatus of claim 1 further comprising means to direct a portion of the fuel from the second supply means to the hydraulic cylinder means, the fuel acting as the actuating fluid.

* * * * *

UNITED STATES PATENT AND TRADEMARK OFFICE
CERTIFICATE OF CORRECTION

PATENT NO. : 4,501,117
DATED : February 26, 1985
INVENTOR(S) : CANIVET

It is certified that error appears in the above-identified patent and that said Letters Patent is hereby corrected as shown below:

Col. 1, line 10: "are" should be -- area --;
Col. 5, line 3: "emergcy" should be -- emergency --;
Col. 6, line 21: "emerency" should be -- emergency --;
Col. 6, line 36: "presure" should be -- pressure --;
Col. 6, line 60: "moment" should be -- movement --;
Col. 7, line 19: "moment" should be -- movement --;

IN THE CLAIMS:

Claim 3, line 2: "psition" should be -- position --;
Claim 13, line 7: "follow" should be -- hollow --.

Signed and Sealed this

Sixth Day of August 1985

[SEAL]

Attest:

DONALD J. QUIGG

Attesting Officer         Acting Commissioner of Patents and Trademarks